United States Patent
Soberanes et al.

(10) Patent No.: US 11,880,595 B2
(45) Date of Patent: Jan. 23, 2024

(54) MEMORY CELL ACCESS TECHNIQUES FOR MEMORY SYSTEMS

(71) Applicant: Micron Technology, Inc., Boise, ID (US)

(72) Inventors: Nicolas Soberanes, Boise, ID (US); Joseph A. De La Cerda, Boise, ID (US); Benjamin Rivera, Boise, ID (US); Bruce J. Ford, Meridian, ID (US)

(73) Assignee: Micron Technology, Inc., Boise, ID (US)

( * ) Notice: Subject to any disclaimer, the term of this patent is extended or adjusted under 35 U.S.C. 154(b) by 49 days.

(21) Appl. No.: 17/091,980

(22) Filed: Nov. 6, 2020

(65) Prior Publication Data

US 2022/0147270 A1 May 12, 2022

(51) Int. Cl.
*G06F 3/06* (2006.01)
*G06N 20/00* (2019.01)

(52) U.S. Cl.
CPC .......... *G06F 3/0659* (2013.01); *G06F 3/0604* (2013.01); *G06F 3/0679* (2013.01); *G06N 20/00* (2019.01)

(58) Field of Classification Search
CPC .... G06F 3/0659; G06F 3/0604; G06F 3/0679; G06N 20/00
See application file for complete search history.

(56) References Cited

U.S. PATENT DOCUMENTS

| | | | |
|---|---|---|---|
| 2016/0283116 A1* | 9/2016 | Ramalingam | G06F 3/0629 |
| 2018/0189674 A1* | 7/2018 | Hillard | G06N 20/00 |
| 2019/0095116 A1* | 3/2019 | Igahara | G06F 12/10 |
| 2019/0220218 A1* | 7/2019 | Deshe | G06F 3/0679 |
| 2020/0019311 A1* | 1/2020 | Zolotow | G06F 3/0661 |
| 2020/0110536 A1* | 4/2020 | Navon | G06N 3/02 |
| 2020/0185027 A1* | 6/2020 | Rom | G11C 11/5628 |
| 2020/0192738 A1* | 6/2020 | Sarkar | G06F 11/3433 |

* cited by examiner

*Primary Examiner* — Kalpit Parikh
(74) *Attorney, Agent, or Firm* — Holland & Hart LLP

(57) ABSTRACT

Methods, systems, and devices for memory cell access techniques for memory systems are described. A memory system may receive, from a host system, a set of commands to write data to the memory system. The memory system may analyze a set of parameters associated with the set of commands based on receiving the set of commands. The memory system may determine whether to write the data of the set of commands to the memory system using a first mode or a second mode based on analyzing the parameters. The memory system may write the data using the first mode or the second mode based on the determining.

19 Claims, 7 Drawing Sheets

MEMORY CELL ACCESS TECHNIQUES FOR MEMORY SYSTEMS

BACKGROUND

The following relates generally to one or more memory systems and more specifically to memory cell access techniques for memory systems.

Memory devices are widely used to store information in various electronic devices such as computers, wireless communication devices, cameras, digital displays, and the like. Information is stored by programing memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read, or sense, the state of one or more memory cells within the memory device. To store information, a component may write, or program, one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), ferroelectric RAM (FeRAM), magnetic RAM (MRAM), resistive RAM (RRAM), flash memory, phase change memory (PCM), 3-dimensional cross-point memory (3D cross point), not-or (NOR), and not-and (NAND) memory devices, and others. Memory devices may be volatile or non-volatile. Volatile memory cells (e.g., DRAM cells) may lose their programmed states over time unless they are periodically refreshed by an external power source. Non-volatile memory cells (e.g., NAND memory cells) may maintain their programmed states for extended periods of time even in the absence of an external power source.

DETAILED DESCRIPTION

Figure 1:
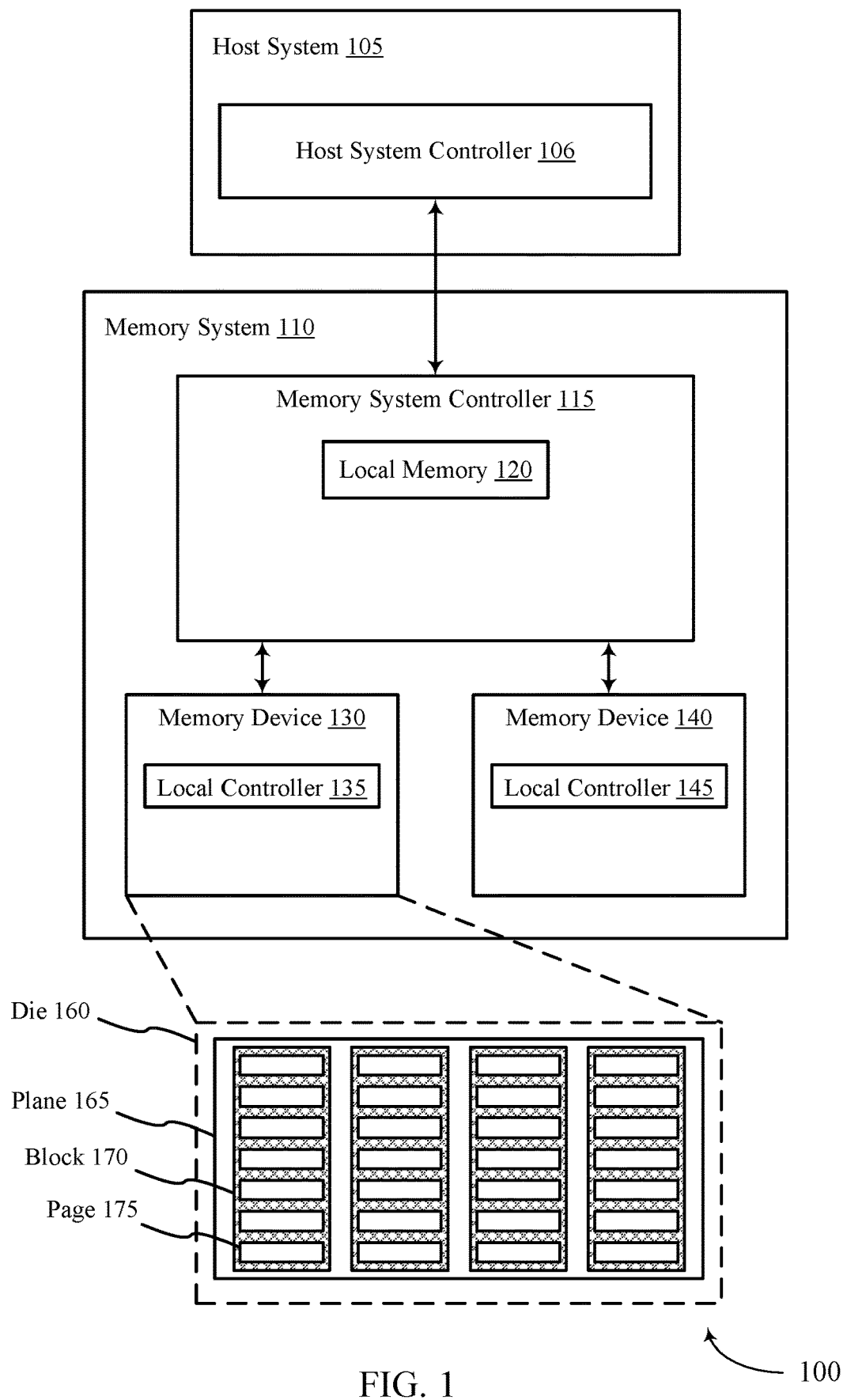
FIG. 1 illustrates an example of a system that supports memory cell access techniques for memory systems in accordance with examples as disclosed herein.

Some memory systems may support multiple access modes, such as a single-level cell (SLC) access mode, multi-level cell (MLC) access modes (e.g., two levels), a tri-level cell (TLC) access mode, a quad-level cell (QLC) access mode, or other quantity of levels. For example, a system may include a host system and a memory system coupled with the host system. The memory system may include one or more memory arrays for storing data. The one or more memory arrays may include not-and (NAND) cells for such storage. In some examples, the memory system may write data to the memory arrays using a SLC access mode. For example, the memory system may write a single bit on information to a respective memory cell, which may result in relatively high data throughput (e.g., relatively high performance for data storage), among other advantages. In some examples, the memory system may write data to the memory arrays in accordance with an MLC access mode. For example, the memory system may write two, three, four, or more bits of information to a respective memory cell of the memory array when operating in different access modes, among other examples, which may result in increased storage density and improved memory utilization, among other advantages.

However, in some cases the memory system may operate in such access modes relatively inefficiently. For example, the memory system may experience relatively high latency and/or a high error rate (e.g., due to operating in an MLC access mode for one or more relatively high performance applications). Additionally or alternatively, the memory system may experience a relatively high write amplification, for example, due to operating in a SLC access mode for relatively low performance applications (e.g., information may be written a relatively high quantity of times between a SLC cache and an MLC cache), which may reduce a life of the memory system (e.g., due to wear from the write amplification).

In accordance with the techniques described herein, a memory system may implement one or more memory cell access techniques to write data using a first mode (e.g., an SLC access mode) or a second mode (e.g., an MLC access mode or other multi-bit access mode). For example, a memory system may receive, from a host system, a set of commands to write data to the memory system. The memory system may analyze a set of parameters associated with the set of commands. The memory system may determine whether to write the data using the first mode or the second mode based on the analysis.

For example, the memory system may include a pattern tool (e.g., a pattern recognition or learning tool using artificial intelligence, among other examples). The memory system may determine a pattern of the set of commands (e.g., a usage pattern) via the pattern tool. In some examples, the memory system may determine that the pattern corresponds to a high performance pattern. In such examples, the memory system may operate in the first mode (e.g., an SLC mode) based on the pattern corresponding to a high performance pattern. In some other examples, the memory system may determine that the pattern corresponds to a low performance pattern. In such examples, the memory system may operate in the second mode (e.g., an MLC mode or other multi-bit access mode) based on the pattern corresponding to a low performance pattern. In some examples, the memory system may tune (e.g., train) the pattern tool. For example, the memory system may identify a training event based on a set of parameters (e.g., parameters associated with the set of commands) satisfying one or more thresholds. The memory system may use the training event to tune the pattern tool. Such techniques may enable the memory system to identify applications associated with relatively high performance commands or low performance commands, which may result in efficient operations and improved lifespan of the memory system while ensuring relatively high performance, among other advantages. Additionally, performing the pattern recognition by the memory system may result in efficient operations and improved lifespan of the memory system while ensuring relatively high performance, among other advantages.

Features of the disclosure are initially described in the context of systems and memory systems as described with reference to FIGS. 1-5. These and other features of the disclosure are further illustrated by and described with reference to a block diagram and a flowchart that relate to memory cell access techniques for memory systems as described with reference to FIGS. 6 and 7.

FIG. 1 is an example of a system 100 that supports memory cell access techniques for memory systems in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any computing device that includes memory and a processing device.

The system 100 may include a host system 105, which may be coupled with the memory system 110. In some examples, this coupling may include an interface with a host system controller 106, which may be an example of a control component configured to cause the host system 105 to perform various operations in accordance with examples as described herein. The host system 105 may include one or more devices, and in some cases may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., PCIe controller, serial advanced technology attachment (SATA) controller). The host system 105 may use the memory system 110, for example, to write data to the memory system 110 and read data from the memory system 110. Although one memory system 110 is shown in FIG. 1, it is to be understood that the host system 105 may be coupled with any quantity of memory systems 110.

The host system 105 may be coupled with the memory system 110 via at least one physical host interface. The host system 105 and the memory system 110 may in some cases be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a peripheral component interconnect express (PCIe) interface, USB interface, Fiber Channel, Small Computer System Interface (SCSI), Serial Attached SCSI (SAS), Double Data Rate (DDR), a dual in-line memory module (DIMM) interface (e.g., DIMM socket interface that supports DDR), Open NAND Flash Interface (ONFI), Low Power Double Data Rate (LPDDR). In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 or memory device 140 included in the memory system 110, or via a respective physical host interface for each type of memory device 130 or memory device 140 included in the memory system 110.

Memory system 110 may include a memory system controller 115, a memory device 130, and a memory device 140. A memory device 130 may include one or more memory arrays of a first type of memory cells (e.g., a type of non-volatile memory cells), and a memory device 140 may include one or more memory arrays of a second type of memory cells (e.g., a type of volatile memory cells). Although one memory device 130 and one memory device 140 are shown in the example of FIG. 1, it is to be understood that memory system 110 may include any quantity of memory devices 130 and memory devices 140, and that, in some cases, memory system 110 may lack either a memory device 130 or a memory device 140.

The memory system controller 115 may be coupled with and communicate with the host system 105 (e.g., via the physical host interface), and may be an example of a control component configured to cause the memory system 110 to perform various operations in accordance with examples as described herein. The memory system controller 115 may also be coupled with and communicate with memory devices 130 or memory devices 140 to perform operations such as reading data, writing data, erasing data, or refreshing data at a memory device 130 or a memory device 140, and other such operations, which may generically be referred to as access operations. In some cases, the memory system controller 115 may receive commands from the host system 105 and communicate with one or more memory devices 130 or memory devices 140 to execute such commands (e.g., at memory arrays within the one or more memory devices 130 or memory devices 140). For example, the memory system controller 115 may receive commands or operations from the host system 105 and may convert the commands or operations into instructions or appropriate commands to achieve the desired access of the memory devices 130 or memory devices 140. And in some cases, the memory system controller 115 may exchange data with the host system 105 and with one or more memory devices 130 or memory devices 140 (e.g., in response to or otherwise in association with commands from the host system 105). For example, the memory system controller 115 may convert responses (e.g., data packets or other signals) associated with the memory devices 130 or memory devices 140 into corresponding signals for the host system 105.

The memory system controller 115 may be configured for other operations associated with the memory devices 130 or memory devices 140. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs))

associated with commands from the host system 105 and physical addresses (e.g., physical block addresses) associated with memory cells within the memory devices 130 or memory devices 140.

The memory system controller 115 may include hardware such as one or more integrated circuits or discrete components, a buffer memory, or a combination thereof. The hardware may include circuitry with dedicated (e.g., hardcoded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally or alternatively include static random access memory (SRAM) or other memory that may be used by the memory system controller 115 for internal storage or calculations, for example, related to the functions ascribed herein to the memory system controller 115. Additionally or alternatively, the local memory 120 may serve as a cache for the memory system controller 115. For example, data may be stored to the local memory 120 when read from or written to a memory device 130 or memory device 140, and may be available within the local memory 120 for subsequent retrieval for or manipulation (e.g., updating) by the host system 105 (e.g., with reduced latency relative to a memory device 130 or memory device 140) in accordance with a cache policy.

Although the example of memory system 110 in FIG. 1 has been illustrated as including the memory system controller 115, in some cases, a memory system 110 may not include a memory system controller 115. For example, the memory system 110 may additionally or alternatively rely upon an external controller (e.g., implemented by the host system 105) or one or more local controllers 135 or local controllers 145, which may be internal to memory devices 130 or memory devices 140, respectively, to perform the functions ascribed herein to the memory system controller 115. In general, one or more functions ascribed herein to the memory system controller 115 may in some cases instead be performed by the host system 105, a local controller 135, or a local controller 145, or any combination thereof.

A memory device 140 may include one or more arrays of volatile memory cells. For example, a memory device 140 may include random access memory (RAM) memory cells, such as dynamic RAM (DRAM) memory cells and synchronous DRAM (SDRAM) memory cells. In some examples, a memory device 140 may support random access operations (e.g., by the host system 105) with reduced latency relative to a memory device 130, or may offer one or more other performance differences relative to a memory device 130.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric RAM (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), and electrically erasable programmable ROM (EEPROM).

In some examples, a memory device 130 or a memory device 140 may include (e.g., on a same die or within a same package) a local controller 135 or a local controller 145, respectively, which may execute operations on one or more memory cells of the memory device 130 or the memory device 140. A local controller 135 or a local controller 145 may operate in conjunction with a memory system controller 115 or may perform one or more functions ascribed herein to the memory system controller 115. In some cases, a memory device 130 or a memory device 140 that includes a local controller 135 or a local controller 145 may be referred to as a managed memory device and may include a memory array and related circuitry combined with a local (e.g., on-die or in-package) controller (e.g., local controller 135 or local controller 145). An example of a managed memory device is a managed NAND (MNAND) device.

In some cases, a memory device 130 may be or include a NAND device (e.g., NAND flash device). A memory device 130 may be or include a memory die 160. For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may take place within different planes 165. For example, concurrent operations may be performed on memory cells within different blocks 170 so long as the different blocks 170 are in different planes 165. In some cases, performing concurrent operations in different planes 165 may be subject to one or more restrictions, such as identical operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may in some cases not be updated until the entire block 170 that includes the page 175 has been erased.

In some cases, to update some data within a block 170 while retaining other data within the block 170, the memory device 130 may copy the data to be retained to a new block 170 and write the updated data to one or more remaining pages of the new block 170. The memory device 130 (e.g., the local controller 135) or the memory system controller 115 may mark or otherwise designate the data that remains in the old block 170 as invalid or obsolete, and update an L2P mapping table to associate the logical address (e.g., LBA) for the data with the new, valid block 170 rather than the old, invalid block 170. In some cases, such copying and remapping may be used instead of erasing and rewriting the entire old block 170, due to latency or wearout considerations, for example. In some cases, one or more copies of an L2P mapping table may be stored within the memory cells of the memory device 130 (e.g., within or more blocks 170 or planes 165) for use (e.g., reference and updating) by the local controller 135 or memory system controller 115.

In some cases, L2P tables may be maintained and data may be marked as valid or invalid at the page level of granularity, and a page 175 may contain valid data, invalid data, or no data. Invalid data may be data that is outdated due to a more recent or updated version of the data being stored in a different page 175 of the memory device 130. Invalid data have been previously programmed to the invalid page 175 but may no longer be associated with a valid logical address, such as a logical address referenced by the host system 105. Valid data may be the most recent version of such data being stored on the memory device 130. A page 175 that includes no data may be a page 175 that has not been written to or that has been erased.

In some cases, a memory system controller 115, a local controller 135, or a local controller 145 may perform operations (e.g., as part of one or more media management algorithms) for a memory device 130 or a memory device 140, such as wear leveling, background refresh, garbage collection, scrub, block scans, health monitoring, or others, or any combination thereof. For example, within a memory device 130, a block 170 may have some pages 175 containing valid data and some pages 175 containing invalid data. To avoid waiting for some or all of the pages 175 in the block 170 to have invalid data in order to erase and reuse the block 170, an algorithm referred to as "garbage collection" may be invoked to allow the block 170 to be erased and released as a free block for subsequent write operations. Garbage collection may refer to a set of media management operations that include, for example, selecting a block 170 that contains valid and invalid data, selecting pages 175 in the block that contain valid data, copying the valid data from the selected pages 175 to new locations (e.g., free pages 175 in another block 170), marking the data in the previously selected pages 175 as invalid, and erasing the selected block 170. As a result, the number of blocks 170 that have been erased may be increased such that more blocks 170 are available to store subsequent data (e.g., data subsequently received from the host system 105).

The system 100 may include any quantity of non-transitory computer readable media that support memory cell access techniques for memory devices. For example, the host system 105, the memory system controller 115, a memory device 130, or a memory device 140 may include or otherwise may access one or more non-transitory computer readable media storing instructions (e.g., firmware) for performing the functions ascribed herein to the host system 105, memory system controller 115, memory device 130, or memory device 140. For example, such instructions, when executed by the host system 105 (e.g., by the host system controller 106), by the memory system controller 115, by a memory device 130 (e.g., by a local controller 135), or by a memory device 140 (e.g., by a local controller 145), may cause the host system 105, memory system controller 115, memory device 130, or memory device 140 to perform one or more associated functions as described herein.

The system 100 may implement one or more memory cell access techniques to write data using a first mode (e.g., an SLC access mode) or a second mode (e.g., an MLC access mode or other multi-bit access mode). For example, the memory system 110 may receive, from the host system 105, a set of commands to write data to the memory device 130 or 140. The memory system 110 or the host system 105 may analyze a set of parameters associated with the set of commands. The system 100 (e.g., the host system 105 or the memory system 110) may determine whether to write the data using the first mode or the second mode based on the analysis.

The system 100 may include a pattern tool (e.g., a pattern recognition or learning tool using artificial intelligence, among other examples). For example, the pattern tool may be included in the memory system 110 (e.g., the memory system controller 115, the memory device 130, the local controllers 135, etc.). The system 100 may determine a pattern of the set of commands (e.g., a usage pattern) via the pattern tool. In some examples, the system 100 may determine that the pattern corresponds to a high performance pattern. In such examples, the system 100 may operate in the first mode (e.g., an SLC mode) based on the pattern corresponding to a high performance pattern. In some other examples, the system 100 may determine that the pattern corresponds to a low performance pattern. In such examples, the system 100 may operate in the second mode (e.g., an MLC mode) based on the pattern corresponding to a low performance pattern. In some examples, the system 100 may tune (e.g., train) the pattern tool. For example, the system 100 may identify a training event based on a set of parameters (e.g., parameters associated with the set of commands) satisfying one or more thresholds. The system 100 may use the training event to tune the pattern tool. Such techniques may enable the system 100 to identify applications associated with relatively high performance commands or low performance commands, which may result in efficient operations and improved lifespan of the system 100 while ensuring relatively high performance, among other advantages.

Figure 2:
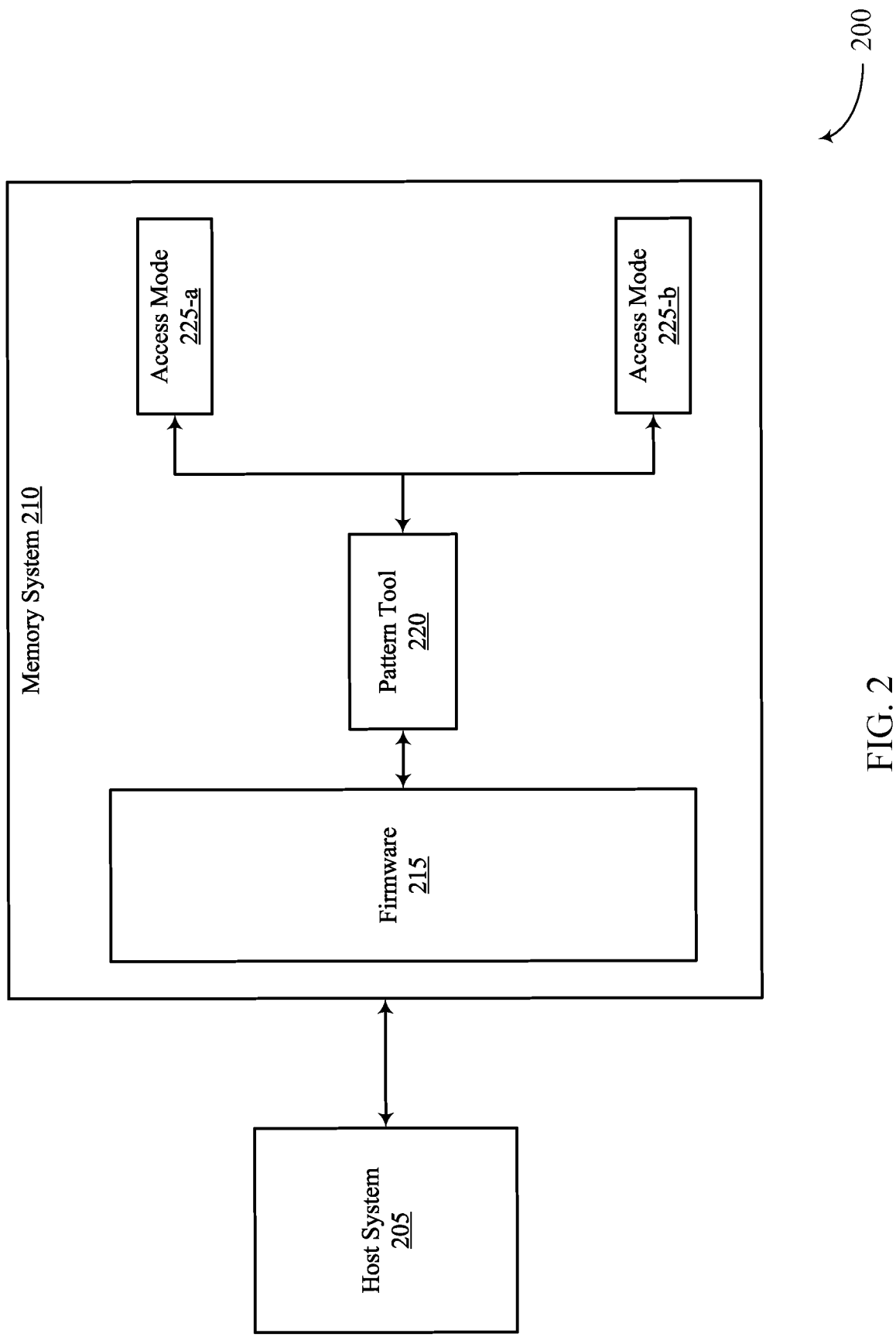
FIG. 2 illustrates an example of a system that supports memory cell access techniques for memory systems in accordance with examples as disclosed herein.

FIG. 2 illustrates an example of a system 200 that supports memory cell access techniques for memory systems in accordance with examples as disclosed herein. In some examples, the system 200 may implement aspects of the system 100. For example, the system 200 may include a host system 205 and a memory system 210, which may be examples of or include aspects of a host system 105 or a memory system 110 as described with reference to FIG. 1. The memory system 210 may include firmware 215 and a pattern tool 220. Generally, the system 200 may illustrate an example system for implementing the pattern tool 220 for operation in the access mode 225-a or the access mode 225-b, although any quantity or type of access modes may be used.

Although the various components of the system 200 are shown as separate for illustrative clarity, the components of the system 200 may be combined or additional components may be added (e.g., the pattern tool may be included in the firmware 215, or may be included in hardware of the memory system 210, or may be included in the host system 205, etc.). Further, components may be located differently than shown (e.g., the host system 205 may include the pattern tool 220, among other examples). In some examples, the operations described as being performed by one component may additionally or alternatively be performed by different components.

The system 200 may support multiple access modes 225, such as a SLC access mode, an MLC access mode, a TLC access mode, or a QLC access mode, among other examples of access modes. As an illustrative example, the memory system 210 may be configured to perform access operations (e.g., write operations, read operations, etc.) in an access mode 225-a or an access mode 225-b.

In some examples, the memory system 210 may store data in memory cells (e.g., NAND cells) using the access mode 225-a. As an illustrative example, the access mode 225-a may be an example of a SLC access mode, and the memory system 210 may store a single bit of information to a memory cell in an SLC cache (e.g., a portion of a memory array associated with operations in the access mode 225-a). Additionally or alternatively, the memory system 210 may store data in memory cells using the access mode 225-b. As another illustrative example, the memory system may write two bits of information to a respective memory cell of the memory array when operating in an MLC access mode, the memory system may write three bits of information to a respective memory cell of the memory array when operating in a TLC access mode, four bits of information to a memory cell when operating in a QLC access mode, etc. In some examples, the term multi-level cell may refer to any access mode that stores two or more bits of information in a single memory cell or the term multi-level cell may refer to the access mode for storing exactly two-bits of information in a memory cell. The memory system 210 may realize relatively high performance (e.g., relatively high speed or throughput of access operations) when operating in the access mode 225-a. Additionally or alternatively, the memory system 210 may realize relatively improved storage density when operating in the access mode 225-b.

In some examples, the system 200 may be configured with a default access mode 225-a. For example, the memory system 210 may operate in the access mode 225-a for operations if there is space in an SLC cache (e.g., if a portion of the memory array used for SLC operations has available memory cells), which may result in relatively high performance for processing operations. However, in some cases such an implementation may result in a relatively high write amplification. For example, the memory system 210 may store data for the access operations in a SLC portion of the device and then rewrite the data to a TLC portion of the device for long term storage in order to free up space in the SLC portion for subsequent access operations. Such additional program or erase cycles may result in wear of the memory system 210, which may reduce a reliability or life of the memory system 210.

In some examples, the host system 205 may indicate an access mode 225 to the memory system 210. For example, the host system 205 may include a write booster component. The host system 205 may transmit one or more commands for one or more operations to the memory system 210 via a data bus. Additionally or alternatively, the host system 205 may transmit a write booster signal to the memory system 210. The write booster signal may indicate whether the memory system 210 is to perform access operations using the access mode 225-a or the access mode 225-b. As an illustrative example, if the write booster is enabled (e.g., the host device transmits a signal indicating the write booster is enabled), the memory system 210 may use the access mode 225-a (e.g., if the SLC cache is available for use). As another example, if the write booster is disabled (e.g., the host device transmits a signal indicating the write booster is disabled), the memory system 210 may use the access mode 225-b for one or more operations based on receiving commands from the host system 205. In some examples, the host system 205 may activate or deactivate the write booster based on one or more thresholds. For example, the host system 205 may determine that a data amount in the command queue satisfies a threshold (e.g., if more than 20 megabytes (MBs) are in the command queue) and the host system 205 may activate the write booster. As another example, the host system 205 may determine that a data amount in the command queue satisfies a different threshold (e.g., if less than 4 Kilobytes (KBs) are in the command queue) and the host system 205 may deactivate the write booster. Some write boost techniques are either activated or deactivated and may be controlled by the host system. Techniques for a more dynamic access mode selector and one controlled by the memory system may be beneficial to improve the efficiency of the memory system.

The system 200 may implement one or more memory cell access techniques to efficiently determine an access mode 225 for operations. For example, the memory system 210 may receive a set of commands to perform one or more access operations (e.g., the host system 205 may send data to write, among other examples of access operations). The memory system 210 may identify a set of parameters associated with the set of commands. For example, the firmware 215 may determine a queue depth of the set of commands (e.g., a quantity of commands in a queue to be processed by a controller of the memory system 210). In some examples, the memory system 210 may be configured with a threshold queue depth (e.g., an upper limit of queue depth of 32 commands). In such examples, the memory system 210 may indicate that the queue depth satisfies the threshold queue depth and the host system 205 may refrain from transmitting further commands based on the indication.

The set of parameters may include one or more opcodes for the set of commands. For example, the firmware 215 may determine an opcode for each command in the set of commands (e.g., a type of command, such as a write command, a read command, among other examples of command types). In some examples, the firmware 215 may determine a quantity of the types of commands that are received, a frequency of a type of command that is received, etc. The set of parameters may include one or more chunk sizes. For example, the firmware 215 may determine a size of data associated with a command in the set of commands. The set of parameters may include a command timestamp. For example, the firmware 215 may determine a time that each command is received and/or processed (e.g., a latency between receiving each command). The set of parameters may include LBA parameters. For example, the firmware 215 may determine a LBA range of a command in the set of commands (e.g., a LBA range of each command).

The memory system 210 may analyze the parameters associated with the received set of commands. For example, the firmware 215 may input the parameters into the pattern tool 220 for analysis. The pattern tool 220 may analyze the input parameters using a machine learning algorithm (e.g., A.I.). For example, the pattern tool 220 may determine a pattern of the set of commands based on analyzing the parameters. As an illustrative example, the pattern tool 220 may classify the set of commands as a high performance case (e.g., an application of the host system 205 may use lower-latency operations) or a low performance case (e.g., higher-latency operations) based on an output of the algorithm. In some examples, the memory system 210 may determine to operate in the access mode 225-a based on analyzing the parameters (e.g., the pattern tool 220 may determine to use an access mode 225 for a high performance case). In some examples, the memory system 210 may determine to operate in the access mode 225-b based on analyzing the parameters (e.g., the pattern tool 220 may determine to use an access mode 225 for a low performance case). By determining to operate in the access mode 225-b, the memory system 210 may avoid transferring the information from being stored as part of an SLC access mode to being stored as part of an MLC access mode (or higher) to increase the density of the storage for longer-term storage, which may reduce the write amplification of the memory system 210.

As an illustrative example, the memory system 210 may determine to use the access mode 225-a (e.g., SLC access) or the access mode 225-b based on a queue depth of the set of commands. For example, the memory system 210 may use the access mode 225-a if a queue depth satisfies a threshold (e.g., the queue depth is relatively high) for a threshold quantity of time, which may improve a performance of the memory system 210. Alternatively, the memory system 210 may determine to use the access mode 225-b (e.g., TLC access) if the queue depth fails to satisfy the threshold (e.g., the queue depth is relatively low) for a threshold quantity of time, which may reduce a write amplification of the memory system 210. Additionally or alternatively, other thresholds may be used for determining to use the access mode 225-a or the access mode 225-b. For example, the memory system 210 may use the access mode 225-a if a threshold quantity of events (e.g., a quantity of received sets of commands for one or more applications) are associated with a queue depth that satisfies a threshold (e.g., if the queue depth is greater than a threshold value a threshold quantity of times). As another example, the memory system 210 may determine to use the access mode 225-a (e.g., the pattern tool 220 may identify a high performance application) if a set of commands corresponds to a relatively small LBA range, if a chunk size of a set of commands is relatively large, etc. Such thresholds may, in some cases, be determined by the machine algorithm of the pattern tool 220. In some examples, the pattern tool 220 may weight a significance of multiple parameters and determine patterns to be high performance or low performance patterns based on an aggregate of the weighted parameters satisfying the one or more thresholds.

In some examples, the memory system 210 may tune the pattern tool 220. For example, the pattern tool 220 may train a machine learning algorithm (e.g., artificial intelligence (AI) of the pattern tool 220) for identifying high performance patterns from received commands. In some examples, the pattern tool 220 (e.g., the algorithm) may be implemented in hardware, firmware, software, or a combination thereof. In some examples, the pattern tool 220 may be implemented by the memory system 210, the host system 205, or a combination thereof.

As an example, the pattern tool 220 may identify a training event based on analyzing a set of parameters (e.g., parameters associated with a set of commands). For example, the pattern tool 220 may determine that a value of one or more of the parameters satisfies one or more thresholds, and the pattern tool 220 may select a set of commands associated with the satisfied thresholds as a training event. The pattern tool 220 may use the training event for training the algorithm to identify performance cases, as described with reference to FIGS. 3-5. Such techniques may enable the system 200 to identify applications associated with relatively high performance commands or low performance commands, which may result in efficient operations and improved lifespan of the memory system while ensuring relatively high performance, among other advantages.

Figure 3:
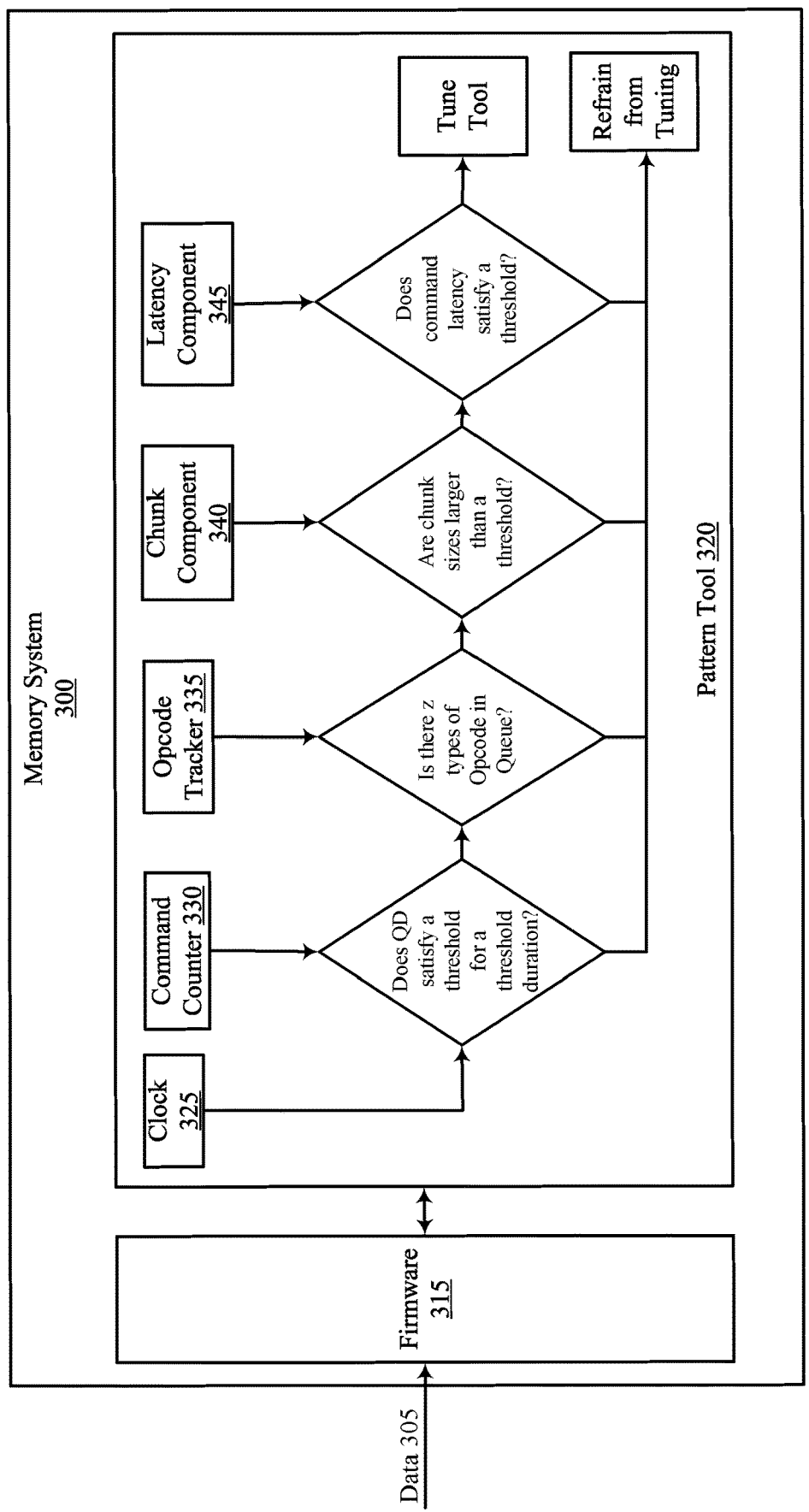
FIGS. 3-5 illustrate examples of memory systems that support memory cell access techniques for memory systems in accordance with examples as disclosed herein.

FIG. 3 illustrates an example of a memory system 300 that supports memory cell access techniques for memory systems in accordance with examples as disclosed herein. In some examples, the memory system 300 may implement aspects of the system 100 or the system 200. For example, the memory system 300 may include firmware 315, and a pattern tool 320, which may be examples of or include aspects of the corresponding devices as described with reference to FIGS. 1 and 2. The memory system 300 may illustrate an example process for training the pattern tool 320 or determining whether to use one or more access modes.

The memory system 300 may receive data 305 from a host system via a data bus. For example, the memory system 300 may receive a set of commands associated with an application of a host system. The set of commands may correspond to one or more parameters. The firmware 315 may identify a set of parameters that correspond to the set of commands. For example, the firmware may determine a queue depth associated with the set of commands, one or more opcodes for the set of commands, one or more chunk sizes for the set of commands, one or more timestamps of the set of commands (e.g., how frequently the commands are received), an LBA range associated with the set of commands, or any combination thereof.

The firmware may input the one or more parameters to the pattern tool 320. The pattern tool 320 may be an example of an algorithm for determining whether to use a first access mode or a second access mode as described herein. The pattern tool 320 may include one or more components or modules for training and/or for determining whether to use a first access mode (e.g., SLC access) or a second access mode (e.g., MLC, TLC, or QLC access). For example, the pattern tool 320 may include a clock 325 which may track a timing associated with the set of commands (e.g., the clock 325 may be used to determine whether one or more parameters satisfy a threshold for a threshold duration of the clock 325). The pattern tool 320 may include a command counter 330, an opcode tracker 335, a chunk component 340, a latency component 345, or any combination thereof, among other examples of components and modules.

In some examples, the memory system 300 may illustrate an example of identifying a training event for tuning the pattern tool 320. For example, the pattern tool 320 may receive the one or more parameters associated with the set of commands and determine whether the parameters satisfy one or more thresholds. The command counter 330 may determine whether a queue depth (QD) satisfies a threshold (e.g., is equal or larger to a threshold QD) for a threshold duration. The opcode tracker 335 may determine whether a quantity of types (or a frequency of a type) in the queue satisfies a threshold (e.g., a threshold "z" amount of types or frequency of a type). The chunk component 340 may determine whether one or more chunk sizes satisfy a threshold (e.g., write data of a size greater than a threshold size) or whether a quantity of the chunk sizes of the commands satisfy a threshold quantity. The latency component 345 may determine whether a command latency satisfies a threshold (e.g., the difference of timestamps between each command indicates that a frequency of received commands satisfies a threshold).

In some examples, one or more of the components of the pattern tool 320 may determine that one or more thresholds are satisfied. The pattern tool 320 may determine to use the set of commands (and associated parameters) to tune the pattern tool 320. Additionally or alternatively, one or more of the components may determine that the parameters of the set of commands fail to satisfy one or more thresholds and the pattern tool 320 may refrain from using the set of commands for training the algorithm of the pattern tool 320.

In some examples, the pattern tool 320 may determine to tune the pattern tool using the set of commands, for example, based on one or more satisfied thresholds. In such examples, the pattern tool 320 may select the parameters associated with the set of commands to be included in a training set for a machine learning algorithm. The result of the parameters may be defined as a high performance case. As one illustrative example, the pattern tool 320 may iteratively adjust one or more parameters of the algorithm and process the training set (e.g., a training set including one or more selected sets of parameters) until the algorithm success for identifying high performance cases and low performance cases satisfies a threshold.

Such tuning may result in one or more potential advantages. For example, the pattern tool 320 may be enabled to dynamically adjust an algorithm to more efficiently activate a first access mode for high performance applications or a second access mode for relatively low performance applications. Additionally or alternatively, the adjusted parameters of the algorithm may be customized for different users. For example, a first user may use a first type of application with relatively low performance thresholds (e.g., streaming, email, etc.). The algorithm may be adjusted such that the first user implements the second access mode for such applications, which may extend a life of the memory system 300, among other benefits. As another example, a second user may use a second type of application with relatively high performance thresholds (e.g., rendering software, gaming, etc.). The algorithm for the second user may be adjusted differently than for the first user. For example, the algorithm may be adjusted such that the second user implements the first access mode relatively more often, which may improve a performance of the memory system 300, among other benefits. Thus, the pattern tool 320 may be dynamically adjusted differently for different users over the life of the device, which may enhance a user experience.

In some examples, the memory system 300 may illustrate an example process for determining whether to operate in a first access mode or a second access mode. For example, the pattern tool 320 may be tuned as described herein. The pattern tool 320 may receive subsequent sets of commands and input them into the tuned algorithm (e.g., an algorithm with parameters customized for a user). The pattern tool 320 may identify a high performance pattern based on the received set of commands (e.g., based on running the parameters associated with the commands through the algorithm) and the memory system 300 may process the commands using the first mode based on the identified high performance pattern. Additionally or alternatively, the pattern tool 320 may identify a low performance pattern based on the received set of commands (e.g., based on running the parameters associated with the commands through the algorithm) and the memory system 300 may process the commands using the second mode based on the identified high performance pattern.

Figure 4:
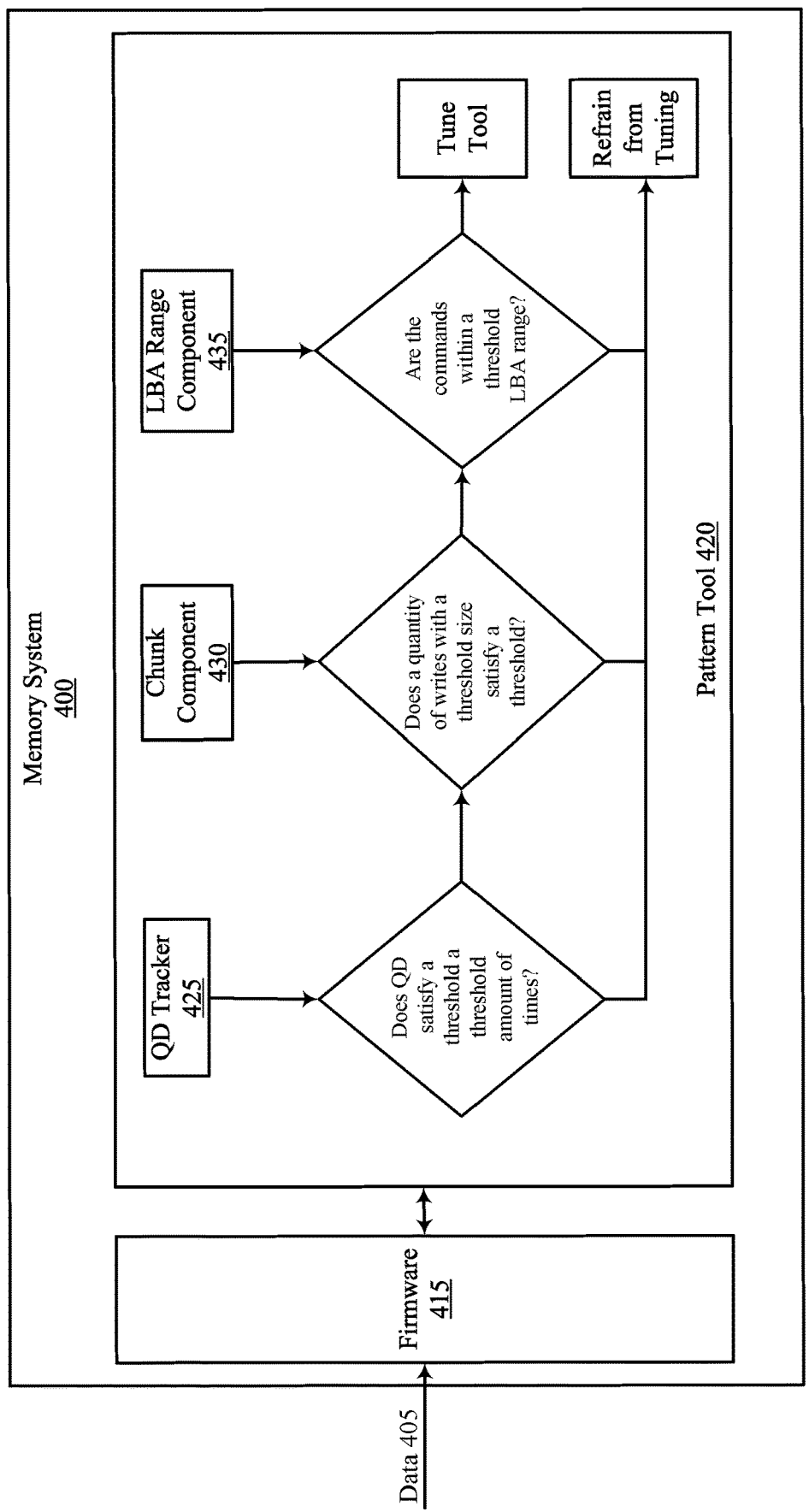

FIG. 4 illustrates an example of a memory system 400 that supports memory cell access techniques for memory systems in accordance with examples as disclosed herein. In some examples, the memory system 400 may implement aspects of the system 100 or the systems 200 and 300. For example, the memory system 400 may include firmware 415, and a pattern tool 420, which may be examples of or include aspects of the corresponding devices as described with reference to FIGS. 1-3. The memory system 400 may illustrate an example process for training the pattern tool 420 or determining whether to use one or more access modes. In some examples, operations of the memory system 400 may be combined with other operations described herein, for example with reference to FIG. 3, or operations may be removed.

The memory system 400 may receive data 405 from a host system via a data bus. For example, the memory system 400 may receive a set of commands associated with an application of a host system. The set of commands may correspond to one or more parameters. The firmware 415 may identify a set of parameters that correspond to the set of commands. For example, the firmware may determine a queue depth associated with the set of commands, one or more opcodes for the set of commands, one or more chunk sizes for the set of commands, one or more timestamps of the set of commands (e.g., how frequently the commands are received), an LBA range associated with the set of commands, or any combination thereof.

The firmware may input the one or more parameters to the pattern tool 420. The pattern tool 420 may be an example of an algorithm for determining whether to use a first access mode or a second access mode as described herein. The pattern tool 420 may include one or more components or modules for training and/or for determining whether to use a first access mode (e.g., SLC access) or a second access mode (e.g., MLC, TLC, or QLC access). For example, the pattern tool 420 may include a QD tracker 425, a chunk component 430, an LBA range component 435, or any combination thereof, among other examples of components and modules.

In some examples, the memory system 400 may illustrate an example of identifying a training event for tuning the pattern tool 420. For example, the pattern tool 420 may receive the one or more parameters associated with the set of commands and determine whether the parameters satisfy one or more thresholds. The QD tracker 425 may determine whether a QD satisfies a threshold for a threshold amount of time. In some cases, the QD tracker 425 may include a command counter (e.g., a received command may increment a counter, which may enable the QD tracker 425 to track a quantity of received commands in a set of commands), a QD counter (e.g., a value of the QD may be monitored by the QD tracker 425), or both. The chunk component 430 may determine whether a quantity of data for a command satisfies a threshold (e.g., whether a quantity of writes with a 'y' chunk size satisfies a threshold 'x'). In some examples, the chunk component 430 may include a command chunk size component to determine a chunk size of a command, a chunk size counter to track a quantity of times that the chunk size is received in a set of commands, or a combination thereof. The LBA range component 435 may be an example of a LBA range calculator. The LBA range component 435 may determine whether a range of LBAs associated with the received commands satisfies a threshold (e.g., a relatively small LBA range may indicate a relatively high performance usage case).

In some examples, one or more of the components of the pattern tool 420 may determine that one or more thresholds are satisfied (e.g., the satisfied thresholds of one or more components may indicate a high performance case). The pattern tool 420 may determine to use the set of commands (and associated parameters) to tune the pattern tool 420. Additionally or alternatively, one or more of the components may determine that the parameters of the set of commands fail to satisfy one or more thresholds and the pattern tool 420 may refrain from using the set of commands for training the algorithm of the pattern tool 420.

In some examples, the pattern tool 420 may determine to tune the pattern tool using the set of commands, for example, based on one or more satisfied thresholds. In such examples, the pattern tool 420 may select the parameters associated with the set of commands to be included in a training set for a machine learning algorithm. The result of the parameters may be defined as a high performance case. As one illustrative example, the pattern tool 420 may iteratively adjust one or more parameters of the algorithm and process the training set (e.g., a training set including one or more selected sets of parameters) until the algorithm success for identifying high performance cases and low performance cases satisfies a threshold.

Such tuning may result in one or more potential advantages. For example, the pattern tool 420 may be enabled to dynamically adjust an algorithm to more efficiently activate a first access mode for high performance applications or a second access mode for relatively low performance applications. Additionally or alternatively, the adjusted parameters of the algorithm may be customized for different users. For example, a first user may use a first type of application with relatively low performance thresholds (e.g., streaming, email, etc.). The algorithm may be adjusted such that the first user implements the second access mode for such applications, which may extend a life of the memory system 400, among other benefits. As another example, a second user may use a second type of application with relatively high performance thresholds (e.g., rendering software, gaming, etc.). The algorithm for the second user may be adjusted differently than for the first user. For example, the algorithm may be adjusted such that the second user implements the first access mode relatively more often, which may improve a performance of the memory system 400, among other benefits. Thus, the pattern tool 420 may be dynamically adjusted differently for different users over the life of the device, which may enhance a user experience.

In some examples, the memory system 400 may illustrate an example process for determining whether to operate in a first access mode or a second access mode. For example, the pattern tool 420 may be tuned as described herein. The pattern tool 420 may receive subsequent sets of commands and input them into the tuned algorithm (e.g., an algorithm with parameters customized for a user). The pattern tool 420 may identify a high performance pattern based on the received set of commands (e.g., based on running the parameters associated with the commands through the algorithm) and the memory system 400 may process the commands using the first mode based on the identified high performance pattern. Additionally or alternatively, the pattern tool 420 may identify a low performance pattern based on the received set of commands (e.g., based on running the parameters associated with the commands through the algorithm) and the memory system 400 may process the commands using the second mode based on the identified high performance pattern.

Figure 5:
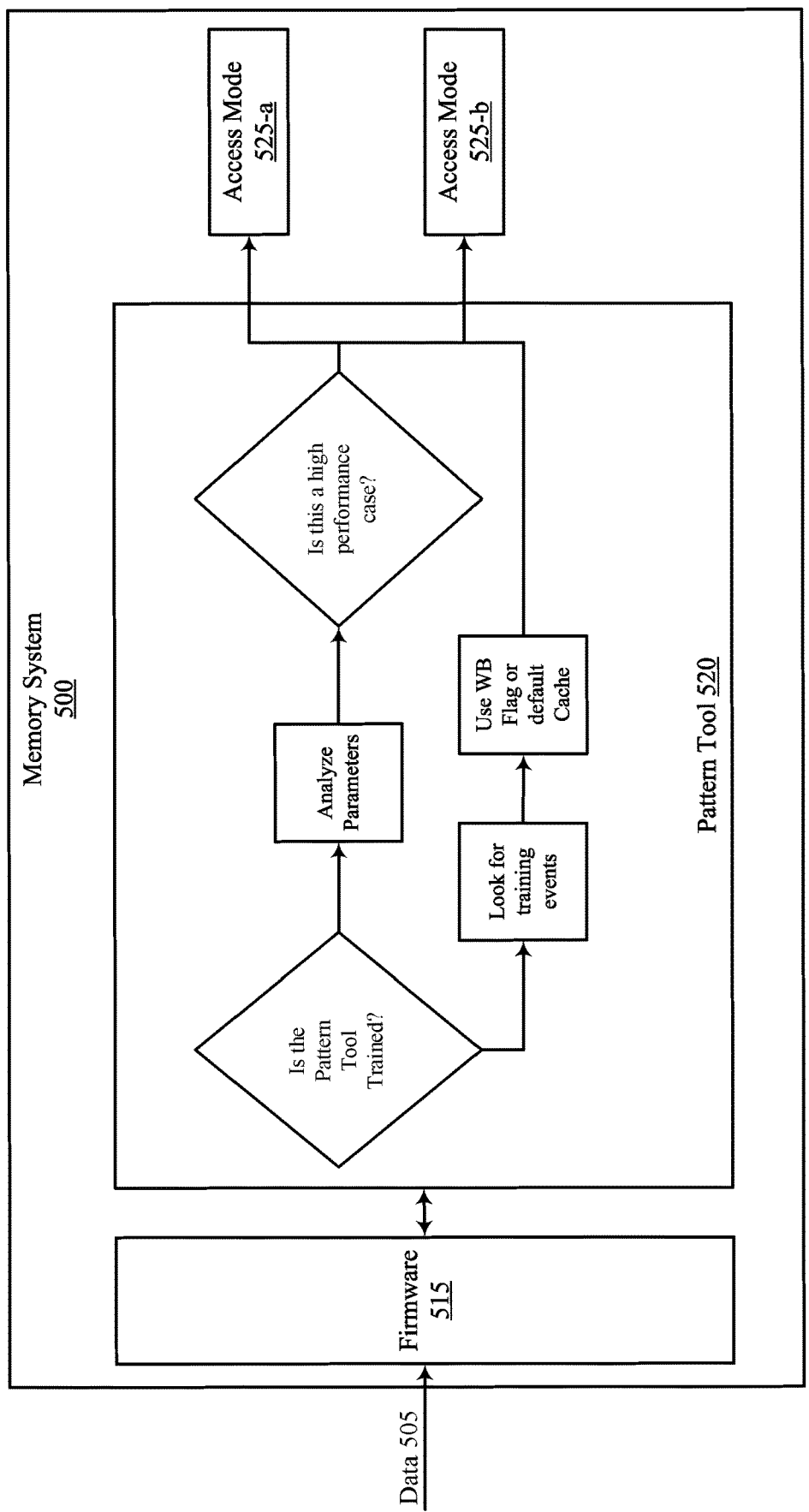

FIG. 5 illustrates an example of a memory system 500 that supports memory cell access techniques for memory systems in accordance with examples as disclosed herein. In some examples, the memory system 500 may implement aspects of the system 100 or the systems 200-400. For example, the memory system 500 may include firmware 515, and a pattern tool 520, which may be examples of or include aspects of the corresponding devices as described with reference to FIGS. 1-3. The memory system 500 may illustrate an example process for training the pattern tool 520 or determining whether to use one or more access modes 525. In some examples, operations of the memory system 500 may be combined with other operations described herein, for example with reference to FIGS. 1-4.

The memory system 500 may receive data 505 from a host system via a data bus. For example, the memory system 500 may receive a set of commands associated with an application of a host system. The set of commands may correspond to one or more parameters. The firmware 515 may identify a set of parameters that correspond to the set of commands. For example, the firmware may determine a queue depth associated with the set of commands, one or more opcodes for the set of commands, one or more chunk sizes for the set of commands, one or more timestamps of the set of commands (e.g., how frequently the commands are received), an LBA range associated with the set of commands, or any combination thereof, among other examples of parameters.

The firmware 515 may input the one or more parameters to the pattern tool 520. The pattern tool 520 may be an example of an algorithm for determining whether to use a first access mode or a second access mode as described herein. For example, the pattern tool 520 may include one or more components or modules for training and/or for determining whether to use a first access mode 525-*a* (e.g., SLC access) or a second access mode 525-*b* (e.g., MLC, TLC, or QLC access), such as the components described with reference to FIGS. 1-4.

The pattern tool 520 may determine whether the pattern tool 520 is trained (e.g., whether an algorithm is tuned). In some examples, the pattern tool 520 may determine that the pattern tool is not trained. In such examples, the pattern tool 520 may determine whether the set of parameters includes a training event (e.g., as described with reference to FIGS. 3 and 4). Additionally or alternatively, the pattern tool 520 may refrain from using the algorithm to determine whether to use the access mode 525-*a* or 525-*b*. For example, the pattern tool 520 may use a write booster (WB) flag or signal to determine to use the access mode 525-*a* or 525-*b*, or the memory system 500 may be configured with a default access mode 525 (e.g., a default SLC cache), among other examples.

In some examples, the pattern tool 520 may determine that the pattern tool 520 is trained (e.g., the machine algorithm has been trained on high performance cases as described herein). In such examples, the pattern tool 520 may analyze the parameters. The pattern tool 520 may classify the commands (e.g., the data 505) as a high performance case or a low performance case. In some examples, the pattern tool 520 may determine that the set of commands corresponds to a high performance case. In such examples, the memory device may use the access mode 525-*a* based on the determination (e.g., an SLC access mode). In some other examples, the pattern tool 520 may determine that the set of commands does not correspond to a high performance case (e.g., the output of the algorithm may classify the set of commands as a low performance case. In such examples, the memory system 500 may use the access mode 525-*b* based on the determination (e.g., MLC, TLC, or QLC access mode).

Various operations shown in the memory system 500 may be added, removed, or modified. For example, the pattern tool 520 may train on a set of commands in addition to determining whether the commands include a high performance case (e.g., based on analyzing the parameters). The memory system 500 may include aspects of the memory systems described with reference to FIGS. 1-4, and vice versa.

Figure 6:
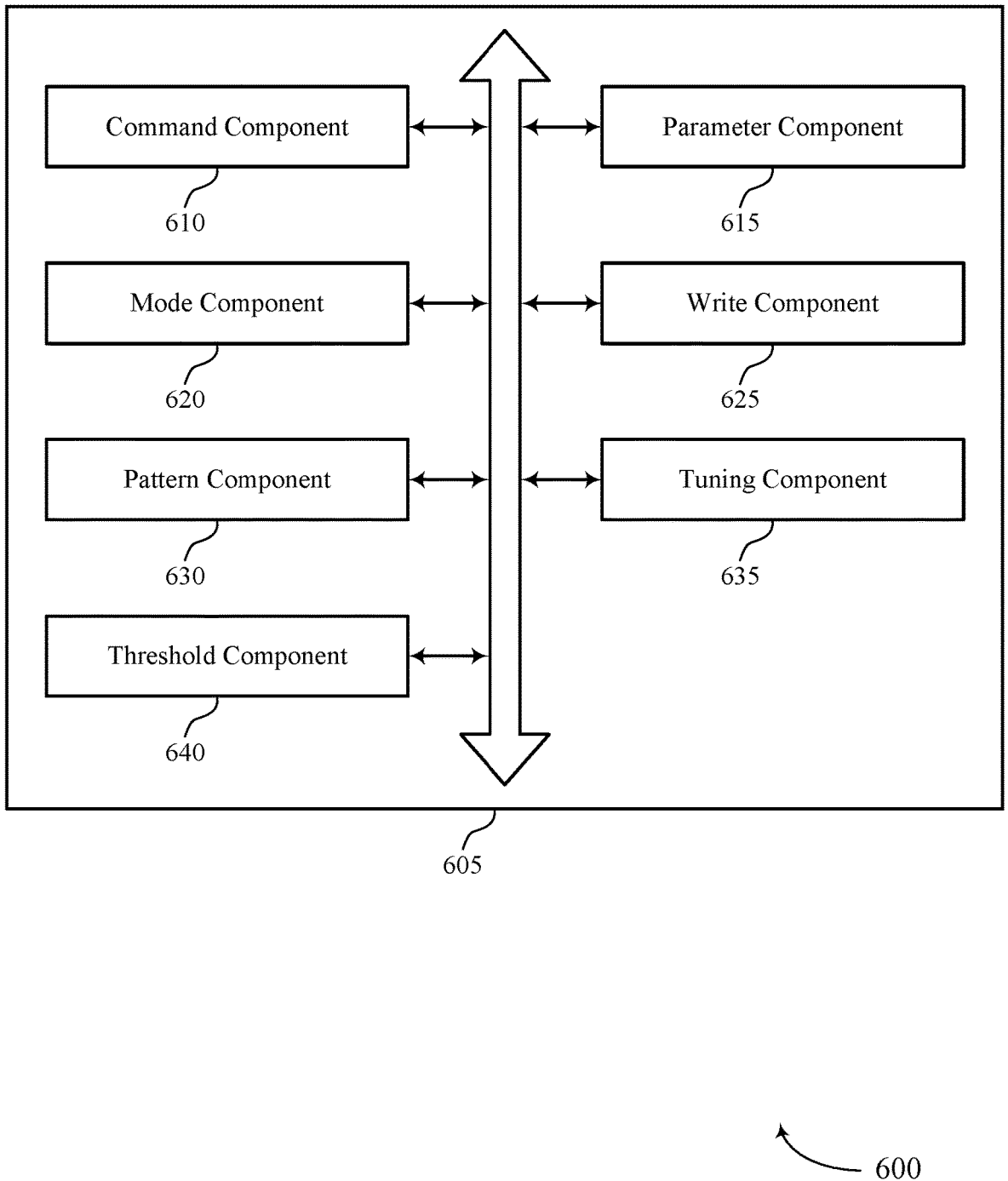
FIG. 6 shows a block diagram of a memory system that supports memory cell access techniques for memory systems in accordance with examples as disclosed herein.

FIG. 6 shows a block diagram 600 of a memory system 605 that supports memory cell access techniques for memory systems in accordance with examples as disclosed herein. The memory system 605 may be an example of aspects of a memory system as described with reference to FIGS. 1-5. The memory system 605 may include a command component 610, a parameter component 615, a mode component 620, a write component 625, a pattern component 630, a tuning component 635, and a threshold component 640. Each of these modules may communicate, directly or indirectly, with one another (e.g., via one or more buses).

The command component 610 may receive, from a host system, a set of commands to write data to the memory system. In some examples, the command component 610 may receive a second set of commands to write second data to the memory system.

The parameter component 615 may analyze a set of parameters associated with the set of commands based on receiving the set of commands. In some examples, the parameter component 615 may analyze a second set of parameters associated with the second set of commands based on the machine learning algorithm satisfying the quality threshold.

The mode component 620 may determine whether to write the data of the set of commands to the memory system using a first mode or to write the data to the memory system using a second mode based on analyzing the set of parameters. In some examples, the mode component 620 may determine whether to write the second data of the second set of commands to the memory system using the first mode or the second mode based on analyzing the second set of parameters.

In some cases, the first mode includes a SLC mode associated with memory cells of the memory array. In some cases, the second mode includes an MLC mode, a TLC mode, or a QLC mode associated with the memory cells of the memory array.

The write component 625 may write the data to the memory system using the first mode based on the determining. In some examples, the write component 625 may write the second data to the memory system using the first mode or the second mode based on the determining. In some examples, the write component 625 may write the second data to the memory array based on a value of a signal, a default mode, or a combination thereof.

In some examples, the write component 625 may write a single bit of the data to a memory cell of the memory array when using the first mode. In some examples, the write component 625 may write a set of bits of the data to a memory cell of the memory array when using the second mode.

The pattern component 630 may determine a pattern of the set of commands based at least in part on analyzing the set of parameters, where determining whether to write the data using the first mode or to write the data using the second mode further includes determining that the pattern of the set of commands corresponds to the first mode, where writing the data to the memory system using the first mode is based on determining that the pattern of the set of commands corresponds to the first mode.

The tuning component 635 may determine whether a machine learning algorithm of the memory system and for determining whether to use the first mode or the second mode is tuned. In some examples, the tuning component 635 may tune the machine learning algorithm using the second set of commands, writing the second data to the memory system using the first mode or the second mode, or both based on determining whether the machine learning algorithm of the memory system is tuned. In some examples, the tuning component 635 may tune the machine learning algorithm using the second set of commands based on based on determining the machine learning algorithm fails to satisfy the quality threshold.

The threshold component 640 may determine that the machine learning algorithm of the memory system satisfies a quality threshold. In some examples, the threshold component 640 may determine that the machine learning algorithm for determining whether to use the first mode or the second mode fails to satisfy a quality threshold. In some examples, the threshold component 640 may determine that a second set of parameters associated with the second set of commands satisfies one or more thresholds, where tuning the machine learning algorithm is based on the second set of parameters satisfying the one or more thresholds.

Figure 7:
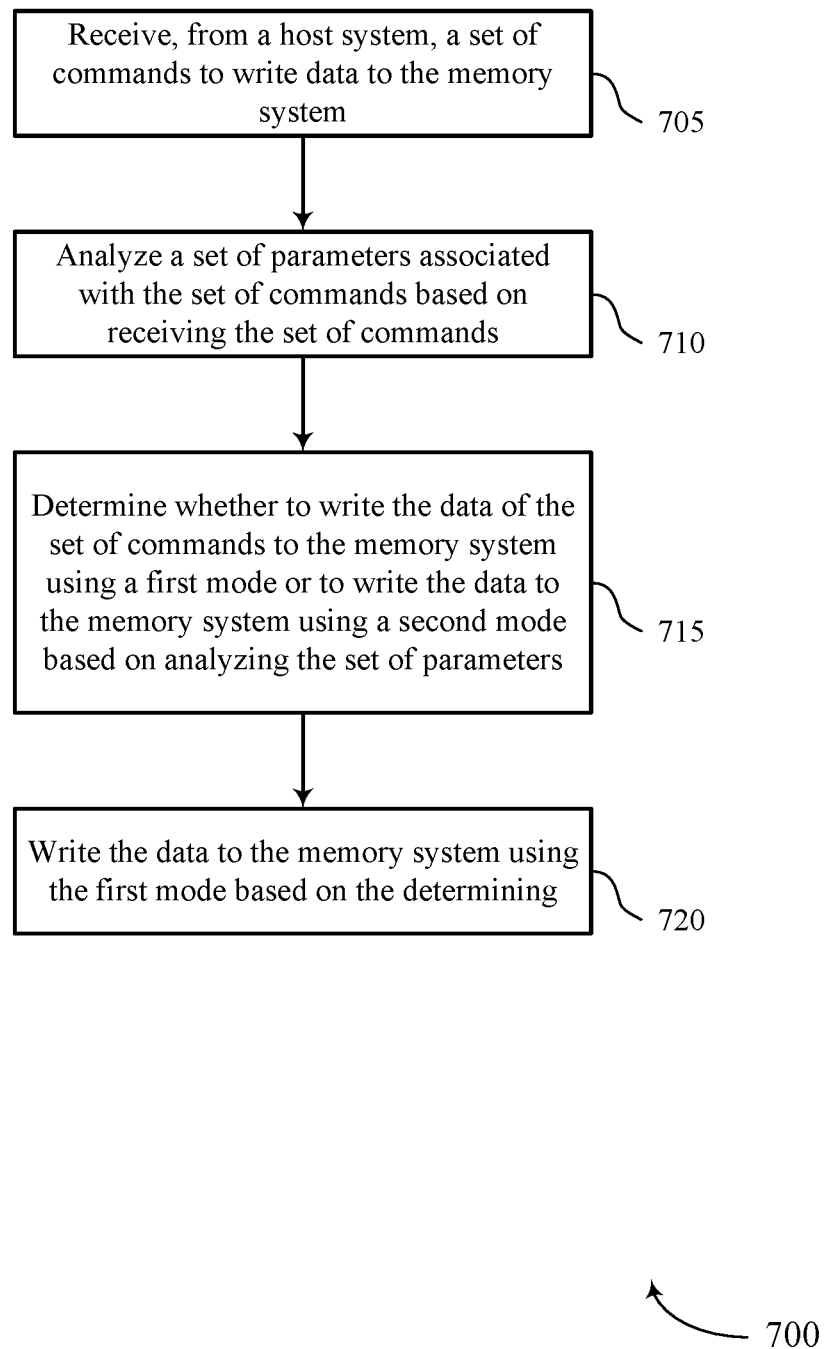
FIG. 7 shows a flowchart illustrating a method or methods that support memory cell access techniques for memory systems in accordance with examples as disclosed herein.

FIG. 7 shows a flowchart illustrating a method or methods 700 that supports memory cell access techniques for memory systems in accordance with examples as disclosed herein. The operations of method 700 may be implemented by a memory system or its components as described herein. For example, the operations of method 700 may be performed by a memory system as described with reference to FIG. 6. In some examples, a memory system may execute a set of instructions to control the functional elements of the memory system to perform the described functions. Additionally or alternatively, a memory system may perform aspects of the described functions using special-purpose hardware.

At 705, the memory system may receive, from a host system, a set of commands to write data to the memory system. The operations of 705 may be performed according to the methods described herein. In some examples, aspects of the operations of 705 may be performed by a command component as described with reference to FIG. 6.

At 710, the memory system may analyze a set of parameters associated with the set of commands based on receiving the set of commands. The operations of 710 may be performed according to the methods described herein. In some examples, aspects of the operations of 710 may be performed by a parameter component as described with reference to FIG. 6.

At 715, the memory system may determine whether to write the data of the set of commands to the memory system using a first mode or to write the data to the memory system using a second mode based on analyzing the set of parameters. The operations of 715 may be performed according to the methods described herein. In some examples, aspects of the operations of 715 may be performed by a mode component as described with reference to FIG. 6.

At 720, the memory system may write the data to the memory system using the first mode based on the determining. The operations of 720 may be performed according to the methods described herein. In some examples, aspects of the operations of 720 may be performed by a write component as described with reference to FIG. 6.

In some examples, an apparatus as described herein may perform a method or methods, such as the method 700. The apparatus may include features, means, or instructions (e.g., a non-transitory computer-readable medium storing instructions executable by a processor) for receiving, from a host system, a set of commands to write data to the memory system, analyzing a set of parameters associated with the set of commands based on receiving the set of commands, determining whether to write the data of the set of commands to the memory system using a first mode or to write the data to the memory system using a second mode based on analyzing the set of parameters, and writing the data to the memory system using the first mode based on the determining.

Some examples of the method 700 and the apparatus described herein may further include operations, features, means, or instructions for determining a pattern of the set of commands based on analyzing the set of parameters, where determining whether to write the data using the first mode or to write the data using the second mode further includes determining that the pattern of the set of commands corresponds to the first mode, wherein writing the data to the memory system using the first mode is based at least in part on determining that the pattern of the set of commands corresponds to the first mode.

Some examples of the method 700 and the apparatus described herein may further include operations, features, means, or instructions for receiving a second set of commands to write second data to the memory system, determining whether a machine learning algorithm of the memory system and for determining whether to use the first mode or the second mode may be tuned, and tuning the machine learning algorithm using the second set of commands, writing the second data to the memory system using the first mode or the second mode, or both based on determining whether the machine learning algorithm of the memory system may be tuned.

Some examples of the method 700 and the apparatus described herein may further include operations, features, means, or instructions for determining that the machine learning algorithm of the memory system satisfies a quality threshold, analyzing a second set of parameters associated with the second set of commands based on the machine learning algorithm satisfying the quality threshold, determining whether to write the second data of the second set of commands to the memory system using the first mode or the second mode based on analyzing the second set of parameters, and writing the second data to the memory system using the first mode or the second mode based on the determining.

Some examples of the method 700 and the apparatus described herein may further include operations, features, means, or instructions for determining that the machine learning algorithm for determining whether to use the first mode or the second mode fails to satisfy a quality threshold, and tuning the machine learning algorithm using the second set of commands based on based on determining the machine learning algorithm fails to satisfy the quality threshold.

Some examples of the method 700 and the apparatus described herein may further include operations, features, means, or instructions for determining that a second set of parameters associated with the second set of commands satisfies one or more thresholds, where tuning the machine learning algorithm may be based on the second set of parameters satisfying the one or more thresholds.

Some examples of the method 700 and the apparatus described herein may further include operations, features, means, or instructions for writing the second data to the memory array based on a value of a signal, a default mode, or a combination thereof.

Some examples of the method 700 and the apparatus described herein may further include operations, features, means, or instructions for writing a single bit of the data to a memory cell of the memory array when using the first mode.

Some examples of the method 700 and the apparatus described herein may further include operations, features, means, or instructions for writing a set of bits of the data to a memory cell of the memory array when using the second mode.

In some examples of the method 700 and the apparatus described herein, the set of parameters include a queue depth, a chunk size, a logical block address range, a time stamp, or a command type, or any combination thereof.

In some examples of the method 700 and the apparatus described herein, the first mode includes a SLC mode associated with memory cells of the memory array, and the second mode includes an MLC mode, TLC mode, or a QLC mode associated with the memory cells of the memory array.

In some examples of the method 700 and the apparatus described herein, determining whether to write the data using the first mode or the second mode uses a machine-learning algorithm implemented by the controller associated with a non-transitory computer-readable medium storing code memory system.

It should be noted that the methods described above describe possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to condition of moving from an open-circuit relationship between components in which signals are not presently capable of being communicated between the components over a conductive path to a closed-circuit relationship between components in which signals are capable of being communicated between components over the conductive path. When a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other when the switch is open. When a controller isolates two components, the controller affects a change that prevents signals from flowing between the components using a conductive path that previously permitted signals to flow.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as a n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus, comprising:
   a memory array; and
   a controller coupled with the memory array and configured to cause the apparatus to:
   receive, from a host system, a set of commands to write data to the memory array;
   analyze a set of parameters associated with the set of commands based at least in part on receiving the set of commands;
   determine whether to write the data of the set of commands to the memory array using a first mode or to write the data to the memory array using a second mode based at least in part on analyzing the set of parameters;
   write the data to the memory array using the first mode based at least in part on the determining;
   receive a second set of commands to write second data to the memory array;
   determine whether a machine learning algorithm for determining whether to use the first mode or the second mode is tuned; and
   tune the machine learning algorithm using the second set of commands, writing the second data to the memory array using the first mode or the second mode, or both based at least in part on determining whether the machine learning algorithm is tuned.

2. The apparatus of claim 1, wherein the controller is further configured to cause the apparatus to:
   determine that the machine learning algorithm for determining whether to use the first mode or the second mode satisfies a quality threshold;
   analyze, using the machine learning algorithm, a second set of parameters associated with the second set of commands based at least in part on the machine learning algorithm satisfying the quality threshold;
   determine whether to write the second data of the second set of commands to the memory array using the first mode or the second mode based at least in part on analyzing the second set of parameters; and
   write the second data to the memory array using the first mode or the second mode based at least in part on the determining.

3. The apparatus of claim 1, wherein the controller is further configured to cause the apparatus to:
   determine that the machine learning algorithm for determining whether to use the first mode or the second mode fails to satisfy a quality threshold; and
   tune the machine learning algorithm using the second set of commands based at least in part on based at least in part on the machine learning algorithm fails to satisfy the quality threshold.

4. The apparatus of claim 3, wherein the controller is further configured to cause the apparatus to:
   determine that a second set of parameters associated with the second set of commands satisfies one or more thresholds, wherein tuning the machine learning algorithm is based at least in part on the second set of parameters satisfying the one or more thresholds.

5. The apparatus of claim 3, wherein the controller is further configured to cause the apparatus to:
   write the second data to the memory array based at least in part on a value of a signal, a default mode, or a combination thereof.

6. The apparatus of claim 1, wherein the controller is further configured to cause the apparatus to:
   write a single bit of the data to a memory cell of the memory array when using the first mode.

7. The apparatus of claim 1, wherein the controller is further configured to cause the apparatus to:
   write a plurality of bits of the data to a memory cell of the memory array when using the second mode.

8. The apparatus of claim 1, wherein the set of parameters comprise a queue depth, a chunk size, a logical block address range, a time stamp, or a command type, or any combination thereof.

9. The apparatus of claim 1, wherein:
   the first mode comprises a single-level cell (SLC) mode associated with memory cells of the memory array; and
   the second mode comprises a multi-level cell (MLC) mode, a tri-level cell (TLC) mode, or a quad-level cell (QLC) mode associated with the memory cells of the memory array.

10. The apparatus of claim 1, wherein:
    selecting a write mode from a set of write modes comprising the first mode and the second mode for writing the data of the set of commands to the memory array uses the machine learning algorithm implemented by the controller associated with a non-transitory computer-readable medium storing code memory system.

11. A non-transitory computer-readable medium storing code comprising instructions which, when executed by a processor of an electronic device, cause the electronic device to:
    receive, from a host system, a set of commands to write data to a memory system;
    analyze a set of parameters associated with the set of commands based at least in part on receiving the set of commands;

determine whether to write the data of the set of commands to the memory system using a first mode or to write the data to the memory system using a second mode based at least in part on analyzing the set of parameters;

write the data to the memory system using the first mode based at least in part on the determining;

receive a second set of commands to write second data to the memory system;

determine whether a machine learning algorithm implemented by the memory system and for determining whether to use the first mode or the second mode is tuned; and tune the machine learning algorithm using the second set of commands, writing the second data to the memory system using the first mode or the second mode, or both based at least in part on determining whether the machine learning algorithm of the memory system is tuned.

12. The non-transitory computer-readable medium of claim 11, wherein the instructions, when executed by the processor of the electronic device, further cause the electronic device to:

determine a pattern of the set of commands based at least in part on analyzing the set of parameters, wherein selecting a write mode from a set of write modes comprising the first mode and the second mode for writing the data of the set of commands to the memory system further comprises:

determining that the pattern of the set of commands corresponds to the first mode, wherein writing the data to the memory system using the first mode is based at least in part on determining that the pattern of the set of commands corresponds to the first mode.

13. The non-transitory computer-readable medium of claim 11, wherein the instructions, when executed by the processor of the electronic device, further cause the electronic device to:

determine that the machine learning algorithm of the memory system satisfies a quality threshold;

analyze, using the machine learning algorithm, a second set of parameters associated with the second set of commands based at least in part on the machine learning algorithm satisfying the quality threshold;

determine whether to write the second data of the second set of commands to the memory system using the first mode or the second mode based at least in part on analyzing the second set of parameters; and write the second data to the memory system using the first mode or the second mode based at least in part on the determining.

14. The non-transitory computer-readable medium of claim 11, wherein the instructions, when executed by the processor of the electronic device, further cause the electronic device to:

determine that the machine learning algorithm for determining whether to use the first mode or the second mode fails to satisfy a quality threshold; and tune the machine learning algorithm using the second set of commands based at least in part on based at least in part on the machine learning algorithm fails to satisfy the quality threshold.

15. The non-transitory computer-readable medium of claim 14, wherein the instructions, when executed by the processor of the electronic device, further cause the electronic device to:

determine that a second set of parameters associated with the second set of commands satisfies one or more thresholds, wherein tuning the machine learning algorithm is based at least in part on the second set of parameters satisfying the one or more thresholds.

16. The non-transitory computer-readable medium of claim 14, wherein the instructions, when executed by the processor of the electronic device, further cause the electronic device to:

write the second data to the memory system based at least in part on a value of a signal, a default mode, or a combination thereof.

17. A method performed by a memory system, the method comprising:

receiving, from a host system, a set of commands to write data to the memory system;

analyzing a set of parameters associated with the set of commands based at least in part on receiving the set of commands;

determining whether to write the data of the set of commands to the memory system using a first mode or to write the data to the memory system using a second mode based at least in part on analyzing the set of parameters;

writing the data to the memory system using the first mode based at least in part on the determining;

receiving a second set of commands to write second data to the memory system;

determining whether a machine learning algorithm of the memory system and for determining whether to use the first mode or the second mode is tuned; and tuning the machine learning algorithm using the second set of commands, writing the second data to the memory system using the first mode or the second mode, or both based at least in part on determining whether the machine learning algorithm of the memory system is tuned.

18. The method of claim 17, further comprising:

determining that the machine learning algorithm of the memory system satisfies a quality threshold;

analyzing a second set of parameters associated with the second set of commands based at least in part on the machine learning algorithm satisfying the quality threshold;

determining whether to write the second data of the second set of commands to the memory system using the first mode or the second mode based at least in part on analyzing the second set of parameters; and writing the second data to the memory system using the first mode or the second mode based at least in part on the determining.

19. The method of claim 17, further comprising:

determining that the machine learning algorithm for determining whether to use the first mode or the second mode fails to satisfy a quality threshold; and training the machine learning algorithm using the second set of commands based at least in part on based at least in part on the machine learning algorithm fails to satisfy the quality threshold.

* * * * *